US012701214B2

(12) United States Patent
Yun et al.

(10) Patent No.: US 12,701,214 B2
(45) Date of Patent: Aug. 4, 2026

(54) IMAGE SENSOR WITH TEST CIRCUIT

(71) Applicant: SAMSUNG ELECTRONICS CO., LTD., Suwon-si (KR)

(72) Inventors: Beomsu Yun, Suwon-si (KR); Hyuk Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 18/391,062

(22) Filed: Dec. 20, 2023

(65) Prior Publication Data

US 2024/0214552 A1      Jun. 27, 2024

(30) Foreign Application Priority Data

Dec. 22, 2022   (KR) ........................ 10-2022-0182187

(51) Int. Cl.
*H04N 17/00*      (2006.01)
*H04N 25/76*      (2023.01)
*H04N 25/78*      (2023.01)

(52) U.S. Cl.
CPC ....... *H04N 17/002* (2013.01); *H04N 25/7795* (2023.01); *H04N 25/78* (2023.01)

(58) Field of Classification Search
CPC ...... H04N 5/378; H04N 17/002; H04N 25/69; H04N 25/78; H04N 25/7795; G01R 31/31727; G01R 23/12
See application file for complete search history.

(56) References Cited

U.S. PATENT DOCUMENTS

| | | | |
|---|---|---|---|
| 7,872,645 | B2 | 1/2011 | Myers |
| 8,054,354 | B2 | 11/2011 | Taura |
| 8,473,792 | B2 | 6/2013 | Chakravarty |
| 8,809,759 | B2 | 8/2014 | Mo et al. |
| 10,455,227 | B2 | 10/2019 | Kim et al. |
| 10,616,571 | B2 | 4/2020 | Chae et al. |
| 11,212,472 | B2 | 12/2021 | Lee |
| 2006/0090105 | A1 | 4/2006 | Woods |
| 2013/0089320 | A1* | 4/2013 | Hiyama ................. H04N 25/69 398/9 |
| 2014/0052922 | A1 | 2/2014 | Moyer et al. |

(Continued)

FOREIGN PATENT DOCUMENTS

| | | |
|---|---|---|
| KR | 100941745 B1 | 2/2010 |
| KR | 101446356 B1 | 10/2014 |

(Continued)

*Primary Examiner* — Xi Wang
(74) *Attorney, Agent, or Firm* — Wolf, Greenfield & Sacks, P.C.

(57) ABSTRACT

Provided is an image sensor including a pixel array that includes a plurality of pixels, wherein each of the plurality of pixels is configured to generate an analog signal in response to incident light; an analog-to-digital converter that includes a counter, wherein the analog-to-digital converter is configured to convert the analog signal into a digital signal; and a test circuit that is configured to change a reset code according to a horizontal time period, wherein the reset code corresponds to a first counting value during a reset time period of a test mode according to a count clock signal, and wherein the test circuit is configured to test a counting operation of the counter based on the reset code that changes according to the horizontal time period.

20 Claims, 13 Drawing Sheets

(56)             References Cited

U.S. PATENT DOCUMENTS

2018/0035108  A1*   2/2018   Chae ...................... H04N 25/78
2022/0264082  A1    8/2022   Choo et al.

FOREIGN PATENT DOCUMENTS

KR        20180013040  A      2/2018
KR        20200133870  A     12/2020
KR         102302595  B1      9/2021

* cited by examiner

FIG. 5

IMAGE SENSOR WITH TEST CIRCUIT

CROSS-REFERENCE TO RELATED APPLICATION

This application is based on and claims priority under 35 U.S.C. § 119 to Korean Patent Application No. 10-2022-0182187, filed on Dec. 22, 2022, in the Korean Intellectual Property Office, the disclosure of which is incorporated by reference herein in its entirety.

BACKGROUND

The inventive concept relates to an image sensor, and more particularly, to an image sensor having a test circuit for controlling a test operation of a counter used for analog-to-digital conversion.

An image sensor may include an analog-to-digital converter (ADC) for converting an image signal detected as an analog signal into a digital signal. A pixel array of an image sensor may include a plurality of pixels arranged in a two-dimensional matrix, and each pixel may output an image signal from light energy. Each of the pixels may integrate photocharges corresponding to the amount of light incident through the photodiode, and may output an analog pixel signal according to the integrated photocharges. The pixel signal may be converted into a digital signal by the ADC.

The ADC may include a comparator that compares an image signal corresponding to each column of the pixel array with a ramp signal, and a counter that generates a counting result value or a counting code by performing a counting operation according to the comparison result of the comparator. The counting code of the counter may be output as a pixel signal of a digital signal in response to a column selection signal of a column decoder, and may be finally output to the outside as image data. To implement clear image data, a method for testing whether a counting operation of a counter in an image sensor is normally performed may be necessary.

SUMMARY

The inventive concept provides an image sensor capable of detecting an error in a counting operation by a counter when performing a test on the image sensor.

The technical problems of the inventive concept are not limited to the technical problems mentioned above, and other technical problems not mentioned will be clearly understood by those skilled in the art from the description below.

According to an aspect of the inventive concept, there is provided an image sensor including a pixel array that includes a plurality of pixels, wherein each of the plurality of pixels is configured to generate an analog signal in response to incident light; an analog-to-digital converter that includes a counter, wherein the analog-to-digital converter is configured to convert the analog signal into a digital signal; and a test circuit that is configured to change a reset code according to a horizontal time period, wherein the reset code corresponds to a first counting value during a reset time period of a test mode according to a count clock signal, and wherein the test circuit is configured to test a counting operation of the counter based on the reset code that changes according to the horizontal time period.

According to another aspect of the inventive concept, there is provided a test method of an image sensor for converting an analog signal generated in each of a plurality of pixels into a digital signal using a counter in an analog-to-digital converter, the test method comprising: generating a count clock signal based on a test code that is received in response to a test mode signal; changing a reset code to output different values for each horizontal time period, wherein the reset code comprises a first counting value according to the count clock signal in a reset time period of a test mode; counting the count clock signal according to the reset code; comparing a second counting value with the test code, wherein the second counting value is obtained by subtracting the reset code from an image code, and wherein the image code is a counting value during a signal time period of the test mode; and outputting a comparison result between the second counting value and the test code through a test terminal.

According to another aspect of the inventive concept, there is provided a test circuit for a counter of an image sensor, the test circuit including a test pattern generator that is configured to receive a test code from an external circuit when in a test mode; a clock controller that is configured to generate a count clock signal, generate a count enable signal corresponding to the test mode, and change a reset code based on the counter, wherein the reset code is a value obtained by counting the count clock signal during a reset time period among time periods of a count enable signal; and a comparison logic that is configured to output a comparison result between an output counting value according to the count clock signal and the test code based on the reset code.

BRIEF DESCRIPTION OF THE DRAWINGS

Embodiments will be more clearly understood from the following detailed description taken in conjunction with the accompanying drawings in which:

FIG. 5 is a diagram illustrating an operation of changing a reset code according to some embodiments;

DETAILED DESCRIPTION OF THE EMBODIMENTS

In the above, the embodiments of the inventive concept have been described with reference to the accompanying drawings, but those skilled in the art to which the inventive concept pertains will understand that the inventive concept may be embodied in other certain forms without changing its technical spirit or essential features. Therefore, it should be understood that the embodiments described above are illustrative in all respects and not restrictive. It will be understood that when an element or layer is referred to as being "connected to", or "coupled to" another element or layer, it may be directly on, connected to, or coupled to the other element or layer, or one or more intervening elements or layers may be present. In contrast, when an element is referred to as being "directly coupled," "directly connected," or "directly responsive" to, or "directly on," another element, there are no intervening elements present. In addition, "electrical connection" conceptually includes a physical connection and a physical disconnection.

Hereinafter, embodiments of the inventive concept will be described in detail with reference to the accompanying drawings.

Figure 1:
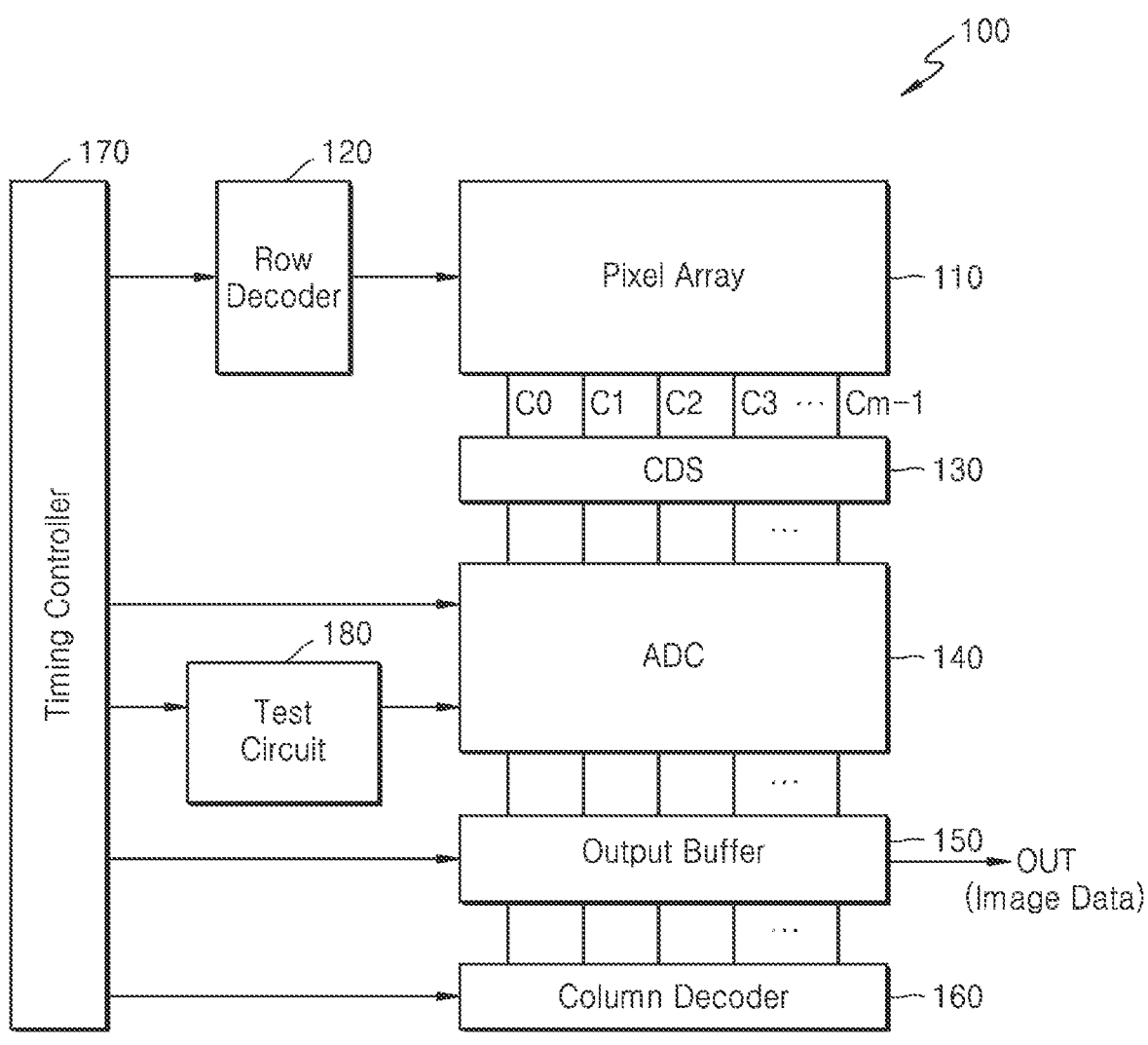
FIG. 1 is a block diagram illustrating an image sensor according to some embodiments.

FIG. 1 is a block diagram illustrating an image sensor according to some embodiments.

Referring to FIG. 1, an image sensor 100 may include a pixel array 110, a row decoder 120, a correlated double sampler (CDS) 130, an analog-to-digital converter (ADC) 140, an output buffer 150, a column decoder 160, a timing controller 170, and a test circuit 180.

The pixel array 110 may include a plurality of pixels arranged in two dimensions. Each pixel may convert an optical signal into an electrical signal. The pixel array 110 may be driven by driving signals, such as a selection signal, a reset signal, and a transmission signal from the row decoder 120. Each pixel senses an electrical signal in response to driving signals, and the sensed electrical signal is provided to the CDS 130 through a plurality of column lines C0, C1, . . . , Cm−1.

The row decoder 120 may select any one row of the pixel array 110 under control by the timing controller 170. The row decoder 120 may generate a selection signal to select at least one row from among a plurality of rows of the pixel array 110. Then, the row decoder 120 may sequentially activate a reset signal and a transmission signal for pixels corresponding to the selected row. Accordingly, the analog reset signal and the image signal generated from each of the pixels of the selected row may be sequentially transferred to the CDS 130.

The CDS 130 may sequentially sample and hold the reference signal (see reference signal REF in FIG. 2) and the image signal (see image signal IMG in FIG. 2) provided to each of the plurality of column lines C0, C1, . . . , Cm−1 from the pixel array 110. That is, the CDS 130 may sample and hold the levels of the reference signal and the image signal corresponding to each of the columns of the pixel array 110. The CDS 130 may transfer the reference signal and the image signal of each of the columns of the pixel array 110 to the ADC 140 as a correlated double sampling signal under control by the timing controller 170.

The ADC 140 may convert the correlated double sampling signal for each column output from the CDS 130 into a digital signal and may output the digital signal. As the ADC 140 may perform counting and arithmetic operations based on the correlated double sampling signal for each column, the ADC 140 may generate noise-removed image data corresponding to each column.

The ADC 140 may include a plurality of column counters provided in each column of the pixel array 110 and may convert the correlated double sampling signal corresponding to each column into a digital signal using the column counter. According to an embodiment, the ADC 140 may include one global counter and convert the correlated double sampling signal corresponding to each column into a digital signal using a global code provided by the global counter.

The output buffer 150 may capture and output image data of each column unit provided from the ADC 140. The output buffer 150 may temporarily store image data output from the ADC 140 under control by the timing controller 170. The output buffer 150 may operate as an interface that compensates for a transmission speed difference between the image sensor 100 and other connected devices.

The column decoder 160 may select a column of the output buffer 150 under control by the timing controller 170, and image data stored in the output buffer 150 may be sequentially output.

The timing controller 170 may control the row decoder 120, the column decoder 160, the ADC 140, and the output buffer 150. The timing controller 170 may provide a clock signal required for their operation and control signals for timing control. The timing controller 170 may include, for example, a logic control circuit, a phase lock loop (PLL) circuit, a timing control circuit, a communication interface circuit, and the like.

The test circuit 180, in the test mode, may receive a test code and test the counter in the ADC 140 based on the test code. The test code may be generated inside the image sensor 100 or provided externally. The test circuit 180 may generate a count clock signal according to the test code, a count enable signal, an offset signal for setting an initial value of the counter, and a clock holding signal for blocking the count clock signal. The test circuit 180 may test the counting operation of the counter according to the count clock signal, the count enable signal, the offset signal, and the clock holding signal. The test circuit 180 may compare an output count value obtained by counting the counter with a test code and may output the comparison result to the outside (e.g., external device) through a test terminal. As used hereinafter, the terms "external/outside device", "external/outside signal", or "outside" are intended to broadly refer to a device, circuit, block, module and/or signal that resides externally (i.e., outside of a functional or physical boundary) with respect to a given circuit, block, module, or device.

Figure 2:
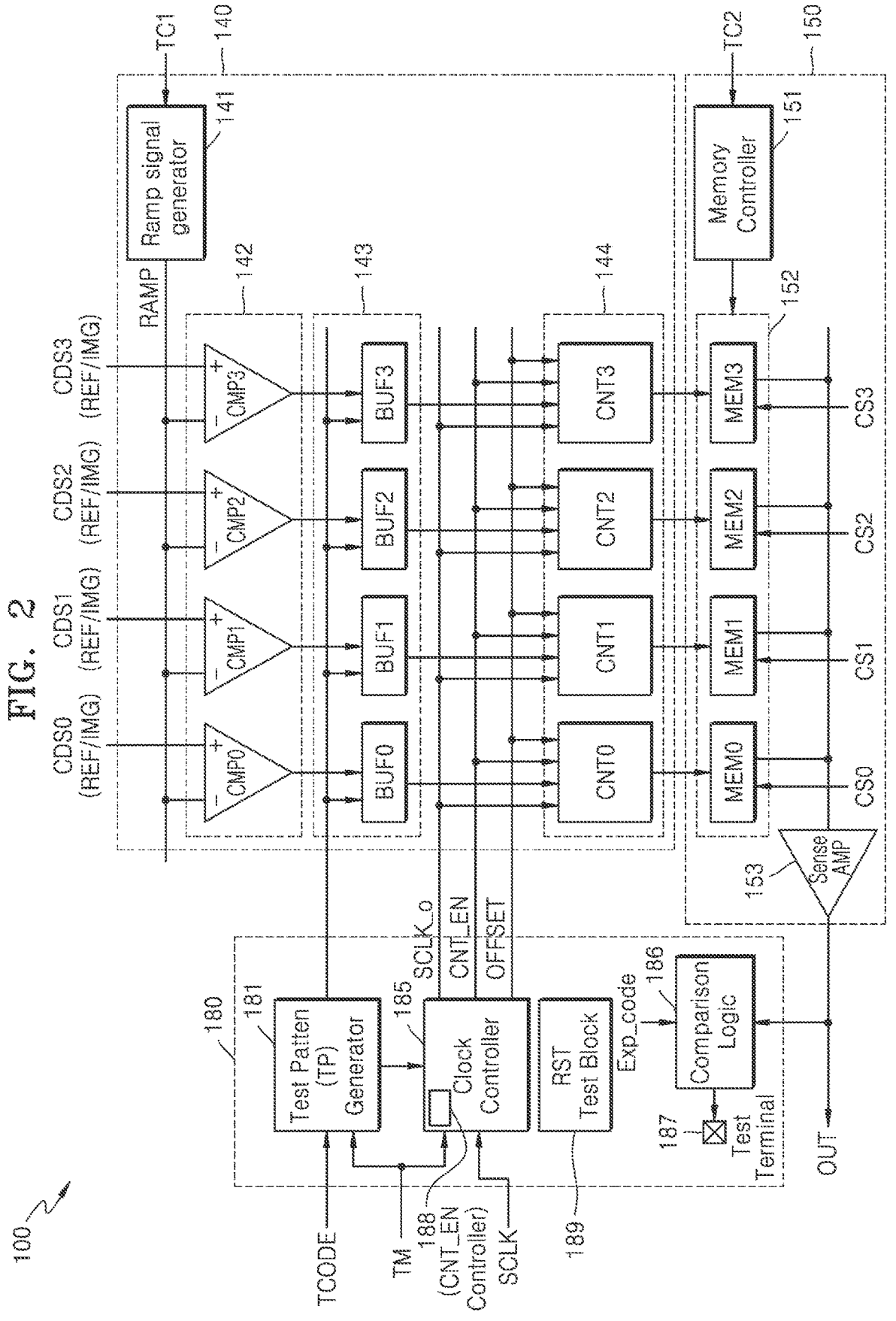
FIG. 2 is a block diagram specifically illustrating an ADC, an output buffer, and a test circuit shown in FIG. 1.

FIG. 2 is a block diagram specifically illustrating an ADC, an output buffer, and a test circuit shown in FIG. 1.

FIG. 2 is a block diagram showing the ADC 140, the output buffer 150, and the test circuit 180 shown in FIG. 1 in detail. According to some embodiments, a plurality of correlated double sampling signal lines may be electrically connected to the plurality of column lines C0, C1, . . . , Cm−1. For example, the correlated double sampling signal lines CDS0 to CDS3 may be respectively and electrically connected to first to fourth column lines C0 to C3 among the plurality of column lines C0, C1, . . . , Cm−1 of the pixel array 110 of FIG. 1. The ADC 140, the output buffer 150, and the test circuit 180 associated therewith will be described. The description of the first to fourth column lines C0 to C3 may be equally applied to the remaining column lines of the plurality of column lines C0, C1, . . . , Cm−1. For example, the number of the plurality of column lines C0, C1, . . . , Cm−1 may be more or less than four. In this specification, a horizontal time period may refer to a time period required to perform one test for counting operations of all counters included in the ADC 140 in the test mode.

Referring to FIG. 2, the ADC 140 may include a ramp signal generator 141, a comparator 142, a buffer circuit 143, and a counter circuit 144.

The ramp signal generator 141 may generate a ramp signal RAMP having a constant slope in response to a control signal TC1 provided from the timing controller 170 (see FIG. 1). For example, the ramp signal generator 141 may generate a ramp signal RAMP having a falling slope in response to the control signal TC1. The ramp signal generator 141 may generate a ramp signal RAMP having a rising slope in response to the control signal TC1. The ramp signal RAMP may be supplied to the comparator 142 and used for a comparison operation between the reference signal REF and the image signal IMG held by the CDS 130. The reference signal REF and the image signal IMG may be referred to as correlated double-sampled signal REF/IMG together.

The comparator 142 may include first to fourth comparators CMP0, CMP1, CMP2, and CMP3 respectively provided for the first to fourth column lines C0 to C3 of the pixel array 110. However, the embodiments of the number of the comparators are not limited thereto. For example, the number of the comparators may be more or less than four. The first to fourth comparators CMP0, CMP1, CMP2, and CMP3 may compare each of the correlated double-sampling signals REF/IMG transmitted through the correlated double-sampling signal lines CDS0 to CDS3 corresponding to the first to fourth columns C0 to C3 with the ramp signal RAMP.

The first comparator CMP0 may receive the ramp signal RAMP through an inverting input terminal (−) of the first comparator CMP0 and receive the correlated double-sampled signal REF/IMG through the first correlated double-sampled signal line CDS0 and a non-inverting input terminal (+) of the first comparator CMP0. The first comparator CMP0 may compare the ramp signal RAMP with the reference signal REF of the correlated double-sampled signal REF/IMG in the first period and may provide the result to a first buffer BUF0. Subsequently, the first comparator CMP0 may compare the ramp signal RAMP with the image signal IMG of the correlated double-sampled signal REF/IMG in a second period and may provide the result to the first buffer BUF0.

Similar to the first comparator CMP0, the other comparators CMP1, CMP2, and CMP3 may also compare the ramp signal RAMP with the correlated double-sampled signal REF/IMG for a corresponding column line (e.g., second to fourth correlated double-sampled signal lines CDS1 to CDS3). The comparison result with the ramp signal RAMP may be provided to the second to fourth buffers BUF1, BUF2, and BUF3, respectively.

The buffer circuit 143 may receive test codes TCODE provided from a test pattern generator 181. The buffer circuit 143 may select and store one of the test codes TCODE and the outputs of the comparators CMP0 to CMP3.

Each of the first to fourth buffers BUF0 to BUF3 of the buffer circuit 143 may store test codes TCODE in the test mode and store outputs of corresponding comparators CMP0, CMP1, CMP2, and CMP3 of the comparator 142 in the normal mode. Each of the first to fourth buffers BUF0 to BUF3 may perform a function of blocking electrical connection between the comparators CMP0 to CMP3 and counters CNT0 to CNT3 of the counter circuit 144 in the test mode.

The counter circuit 144 may include the counters CNT0 to CNT3 electrically connected to the respective first to fourth buffers BUF0 to BUF3. Each of the counters CNT0 to CNT3 may generate a counting code by performing a counting operation in synchronization with the comparison result of the comparators CMP0 to CMP3 stored in the first to fourth buffers BUF0 to BUF3 with the clock signal SCLK. For example, each of the counters CNT0 to CNT3 may generate a counting code by performing an up-counting operation in synchronization with the clock signal SCLK. Each of the counters CNT0 to CNT3 may generate a counting code by performing a down-counting operation in synchronization with the clock signal SCLK. The counting code may be provided in binary code.

Figure 3:
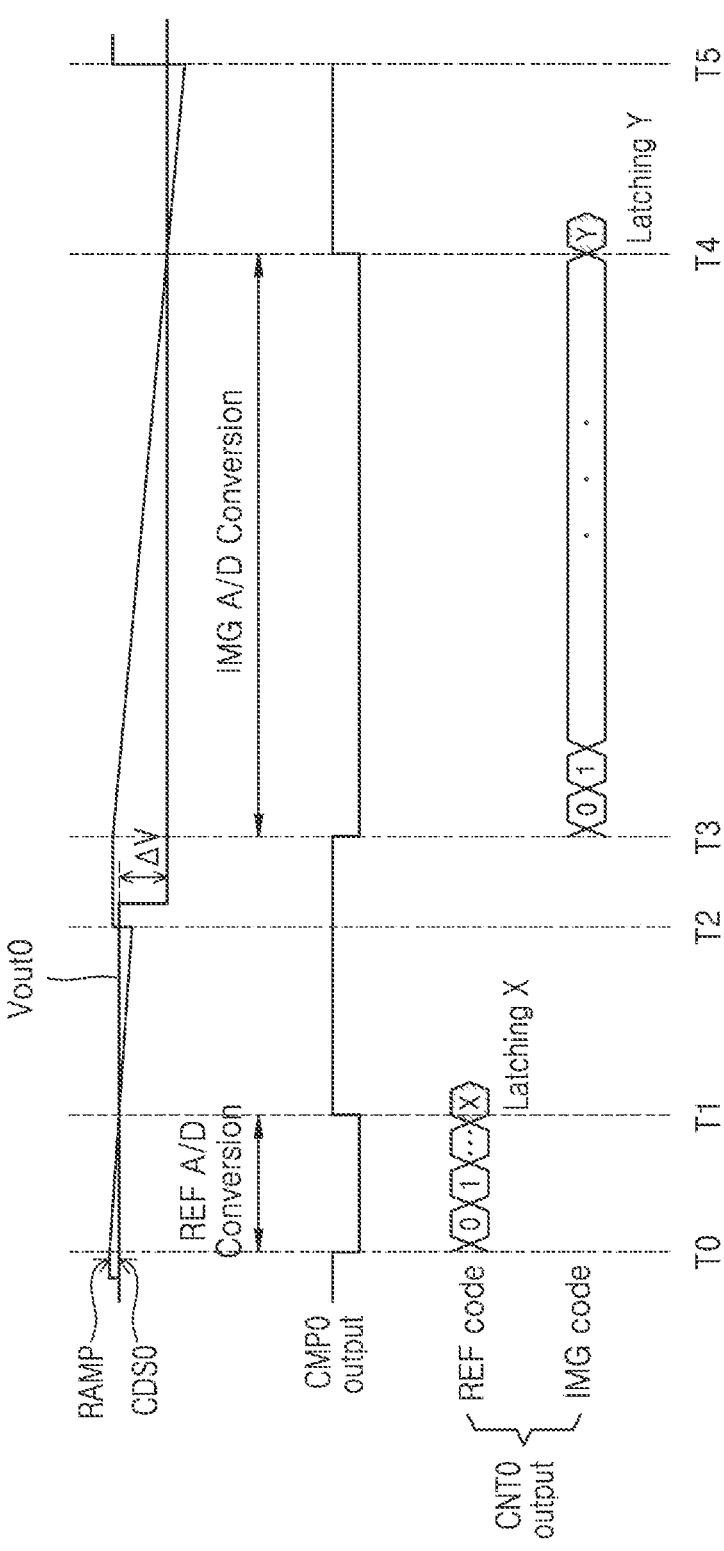
FIG. 3 is a timing diagram illustrating an operation of the ADC of FIG. 2 according to some embodiments.

The operation of the ADC 140 may be described with the timing diagram of FIG. 3. In FIG. 3, the first correlated double-sampled signal line CDS0 corresponding to one column line will be described as an example. The ADC 140 will process the remaining correlated double sampling signal lines CDS1 to CDS3 in a similar (e.g., the same) way.

FIG. 3 is a timing diagram illustrating an operation of the ADC of FIG. 2 according to some embodiments.

In FIG. 3, an operation section for converting the analog signal REF/IMG (e.g., double-sampled signal REF/IMG) of the first correlated double-sampled signal line CDS0 into a digital signal may be divided into two sections. One may be a section for converting a reference signal REF from among correlated double-sampled signals REF/IMG into a digital signal, and time period from time point T0 to time point T2 in the illustrated timing diagram in FIG. 3 may correspond to this section. The other section is a section for converting an image signal IMG from among the correlated double-sampled signals REF/IMG into a digital signal, and time period from time point T3 to time point T5 in the illustrated timing diagram in FIG. 3 may correspond to this section.

From the time point T0, for example, the slope of the ramp signal RAMP may fall. Then, the comparison operation of the first comparator CMP0 may be activated, and the count-up operation of the first counter CNT0 may start. The output of the first comparator CMP0 may maintain, for example, a logic low level L from the time point T0 to the time point T1 where the level of the ramp signal RAMP is higher than the level of the reference signal REF of the correlated double-sampled signal REF/IMG. Thereafter, from the time point T1, the level of the reference signal REF of the correlated double-sampled signal line CDS0 becomes higher than the level of the falling ramp signal RAMP. Accordingly, the output of the first comparator CMP0 may transition to, for example, a logic high level H.

At the time point T1, the first counter CNT0 may be counted up during the logic low level L output section of the first comparator CMP0, and may cause the digital signal value corresponding to the reference signal REF, that is, the reference code (or reset code) X to be latched.

At the time point T2, the ramp signal RAMP and the first counter CNT0 may be initialized. That is, the ramp signal RAMP may rise to the level of the initial ramp signal (e.g., level of the ramp signal RAMP at the time point T0), and the first counter CNT0 may be reset. Then, the image signal IMG of the correlated double-sampled signal REF/IMG may be input to the first comparator CMP0. At this time, since the image signal IMG may be a pixel signal generated according to photocharges accumulated corresponding to the amount of incident light, the image signal IMG may be relatively lower than the reference signal REF.

From the time point T3, the slope of the ramp signal RAMP may start to decrease. At the same time, the comparison operation of the first comparator CMP0 may be activated, and counting of the reset first counter CNT0 may start. The output of the first comparator CMP0 may maintain the logic low level L from the time point T3 to the time point T4 when the level of the ramp signal RAMP is higher than the level of the image signal IMG. From the time point T4, when the level of the image signal IMG is higher than the level of the falling ramp signal RAMP, the output of the first comparator CMP0 may transition to a logic high level H.

At the time point T4, the first counter CNT0 may be counted up during the logic low level L output section of the first comparator CMP0, and may cause the digital signal value corresponding to the image signal IMG, that is, the image code Y, to be latched. The operation of converting the image signal IMG into a digital signal may end at the time point T5.

As a result, the count-up operation of the first counter CNT0 may start at each of the falling time points T0 and T3 of the ramp signal RAMP, a comparison operation of the first comparator CMP0 may be activated, and a comparison result between the ramp signal RAMP and the reference signal REF and the image signal IMG of the correlated double-sampled signal REF/IMG may be output. The reference code X and the image code Y may be obtained at the time points T1 and T4 when the output of the first comparator CMP0 transitions from the logic low level L to the logic high level H.

Again, referring to FIG. 2, the ADC 140 may process a reference code (or reset code) X corresponding to the reference signal REF for each column and an image code Y corresponding to the image signal IMG by the counter circuit 144 to output image data.

For example, the ADC 140 may further include an operator that performs a subtraction operation. The ADC 140 may subtract the reference code X from the image code Y corresponding to each of the columns using an operator. Accordingly, the ADC 140 may generate image data from which noise is removed. Image data will be stored in a column memory circuit 152 of the output buffer 150.

The output buffer 150 may include a memory controller 151, the column memory circuit 152, and a sense amplifier 153. The memory controller 151 may control input/output of the column memories MEM0 to MEM3 in response to a control signal TC2 from the timing controller 170. The column memory circuit 152 may include column memories MEM0 to MEM3 that store image data corresponding to the respective columns. However, the embodiments of the number of the column memories of column memory circuit 152 are not limited thereto. For example, the number of the column memories may be more or less than four. Image data stored in each of the column memories MEM0-MEM3 may be sequentially transmitted to the sense amplifier 153 according to the column selection signals CS0 to CS3 provided from the column decoder 160 (see FIG. 1) and may be output to the outside.

Here, the image data may be generated based on a reference code (or reset code) X corresponding to the reference signal REF for each column and an image code Y corresponding to the image signal IMG. The acquisition of the reference code (or reset code) X and the image code Y may dominate the counting operation of the counters CNT0 to CNT3. Therefore, if it is possible to check whether an error occurs in the counting operation by testing the counting operation of the counters CNT0 to CNT3, it would be useful to implement clear image data. Counters CNT0 to CNT3 may be tested by the test circuit 180.

The test circuit 180 may test the counters CNT0 to CNT3 according to the test mode signal TM, the clock signal SCLK, and the test code TCODE provided from the timing controller 170. The test circuit 180 may include a test pattern generator 181, a clock controller 185, a comparison logic unit 186, and a test terminal 187.

The test pattern generator 181 may receive the test code TCODE in response to the test mode signal TM and provide the test code TCODE to the buffer circuit 143 and the clock controller 185. The test mode signal TM may be a signal instructing the counters CNT0 to CNT3 of the ADC 140 to be tested. The test code TCODE may be a code that controls the counting operation of the counters CNT0 to CNT3, particularly the counting number, and may be provided in various ways.

When the value counted according to the count clock signal SCLK_o in the signal section (signal time period) of the test mode matches the sum of the test code TCODE and the reset code (e.g., reset code X), the test pattern generator 181 may hold the count clock signal SCLK_o by generating and transmitting the clock hold signal Hold_clk to the clock controller 185.

The clock controller 185 may receive the clock signal SCLK and generate a count clock signal SCLK_o according to the test code TCODE and the count enable signal CNT_EN provided from the test pattern generator 181 (or the changed count enable signal CNT_EN_o) in response to the test mode signal TM. Also, the clock controller 185 may generate an offset signal OFFSET for setting initial values of the counters CNT0 to CNT3 in response to the test mode signal TM. The count clock signal SCLK_o, the count enable signal CNT_EN, and the offset signal OFFSET may be selectively provided to the counters CNT0 to CNT3.

The clock controller 185 may hold the count clock signal SCLK_o in response to receiving the clock hold signal Hold_clk from the test pattern generator 181 or the reset clock hold signal from the reset test pattern generator of the test circuit 180.

In some embodiments, when changing the reset code, which is a counting value in the reset section (reset time period) during the test mode, the count enable controller 188 may receive the clock signal SCLK and the basic count enable signal CNT_EN, and change the basic count enable signal CNT_EN to a count enable signal CNT_EN_o by modulating the basic count enable signal CNT_EN (e.g., phase shift by the period of the clock signal SCLK). For example, the clock controller 185 may generate the count clock signal SCLK_o by masking the count enable signal CNT_EN_o with the clock signal SCLK. Masking herein may refer to a process to block or deliver a signal until a specific condition is met.

In some embodiments, when changing the reset code, which is a counting value in the reset section during the test mode, the reset test block 189 may include a random code generator for generating a random code based on a random number generated for each horizontal time period, and a reset test pattern generator for generating a reset clock hold signal to change the reset code based on the result of comparing the value counted by the count clock signal in the reset section with the random code.

In the present specification, a horizontal time period (e.g., 1 h-time) in the test mode may refer to a time required to perform one test for a counting operation of all counters included in the ADC in the test mode. For example, the horizontal time period may refer to a period from the time point at which the clock hold signal transitions from high level to low level in the signal section of the previous horizontal time period to the time point at which the clock hold signal transitions from a high level to a low level in the signal section of the next horizontal time period.

For example, if the random code based on the random number matches the clock counting value counted according to the count clock signal in the reset section, the reset test block 189 may hold the count clock signal of the reset section according to the generated reset clock hold signal, and output the counting value held at the generation time point of the reset clock hold signal as a changed reset code.

The counters CNT0 to CNT3 may perform a counting operation according to the count clock signal SCLK_o and the count enable signal CNT_EN in the test mode. Counting values of the counters CNT0 to CNT3 according to the count clock signal SCLK_o and the count enable signal CNT_EN may be sequentially output through the output buffer 150.

The comparison logic unit 186 may compare the output counting values of the counters CNT0 to CNT3 output from the output buffer 150 with the expected test code Exp_code and may output the comparison result to the test terminal 187. In this case, the expected test code Exp_code may represent a counting value substantially the same as that of the test code TCODE.

When the output counting values of the counters CNT0-CNT3 are identical to the expected test code Exp_code, the comparison logic unit 186 may output, for example, a logic high level H indicating a counting operation pass to the test terminal 187. When the output counting values of the counters CNT0-CNT3 are not identical to the expected test code Exp_code, the comparison logic unit 186 may output, for example, a logic low level L indicating a counting operation fail to the test terminal 187. In the foregoing description, the comparison logic unit 186 may determine whether or not an error occurred in the counting operation based on the comparison result of the output counting values of the counters CNT0-CNT3 and the expected test code Exp_code, but is not limited thereto, and the comparison logic unit 186 may determine whether an error occurs in the counting operation based on a result of comparing the output counting values of the counters CNT0 to CNT3 with the test code TCODE.

As the logic level output to the test terminal 187 is monitored, it may be checked whether the counting operation of the counters CNT0 to CNT3 is pass or fail.

Hereinafter, a method of testing the counters CNT0 to CNT3 of FIG. 2 will be described in detail with reference to FIGS. 4 to 9B.

The counting operation test method according to the comparative example may determine an error in the counting operation based on a final output counting value obtained by subtracting a fixed reset code from an image code, which is a counting value in a signal section. Therefore, the test method according to the comparative example may have a problem in that an error cannot be detected for a test code having the same value as a fixed reset code even when an internal counter defect occurs.

On the other hand, according to the image sensor and the test circuit and the test method according to the embodiments of the current disclosures, by changing the reset code to increase or decrease constantly for each horizontal time period, or changing the reset code to a random value for each horizontal time period, test coverage may be increased in preparation for various defects inside the counter, thereby improving the accuracy of test results.

An image sensor, a test circuit, and a test method thereof according to an embodiment will be described in detail with reference to FIGS. 4 to 9B to be described later.

Figure 4:
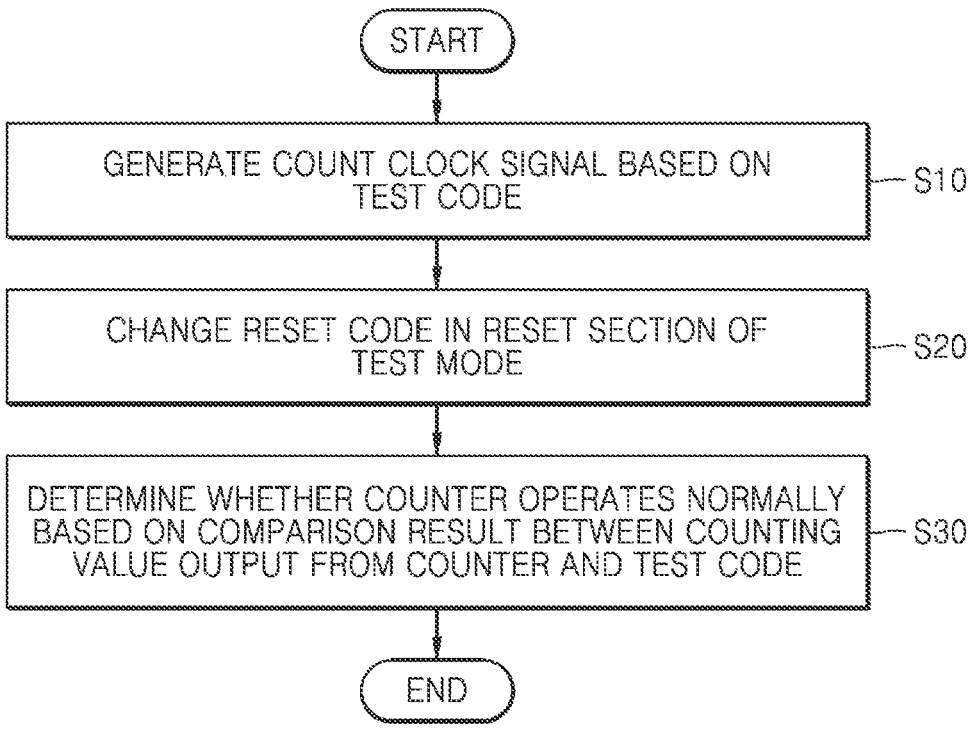
FIG. 4 is a flowchart illustrating a method of operating a test circuit according to some embodiments.

FIG. 4 is a flowchart illustrating a method of operating an image sensor according to some embodiments.

In detail, FIG. 4 is a diagram for explaining an operating method for testing the counting operation of the counter circuit 144 of FIG. 2 by changing the reset code in the reset section of the test mode by the test circuit 180 of the image sensor 100 of FIG. 4.

Unlike the counter circuit 144 counting and outputting the clock signal for the correlated double-sampled signal REF/IMG in the normal mode in which the image sensor normally performs a sensing operation, in the test mode, the input of the correlated double-sampled signal REF/IMG may be cut off, and the counter circuit 144 may output a value counted according to the count enable signal and the count clock signal generated by the test circuit 180 based on the test code. For example, the input of the correlated double-sampled signal REF/IMG may be fixed to a low level. In this specification, the horizontal time period may refer to a time required to perform one test for a counting operation of all counters included in the ADC in a test mode.

Referring to FIG. 4, an operation for testing the counting operation of the counter circuit 144 of FIG. 2 by changing the reset code may include operations S10, S20, and S30.

In operation S10, the test circuit 180 may generate a count clock signal based on the test code. The test circuit 180 may generate a count clock signal according to the received test code and count enable signal (e.g., received from the timing controller 170). The counter circuit 144 may count according to the count clock signal of the section corresponding to the count enable signal during the test mode.

In operation S20, the test circuit 180 may change the reset code in the reset section of the test mode. The test mode may include a 'reset section' for testing the counting operation for the reference signal REF among the correlated double-sampled signals REF/IMG and a 'signal section' for testing the counting operation for the image signal IMG.

In some embodiments, the counter circuit 144 may output a value counted by the counter circuit 144 according to the count enable signal and the count clock signal as a reset code in the reset section.

In some embodiments, the test circuit 180 may change the reset code every horizontal time period through the clock controller 185 of the test circuit 180. An operation of changing the reset code through the clock controller 185 will be described in detail with reference to FIGS. 5 to 7B later.

In the present specification, a horizontal time period (e.g., 1 h-time) in the test mode may refer to a time required to perform one test for a counting operation of all counters included in the ADC in the test mode. For example, the horizontal time period may refer to a period from the time point at which the clock hold signal transitions from high level to low level in the signal section of the previous horizontal time period to the time point at which the clock hold signal transitions from a high level to a low level in the signal section of the next horizontal time period.

In some embodiments, the test circuit 180 may change the reset code based on the random code generated every horizontal time period through the reset test block 189 of FIG. 2 described below. The operation of changing the reset code through the reset test block 189 will be described in detail with reference to FIGS. 8 to 9B later.

In some embodiments, the counter circuit 144 may output a value obtained by subtracting the value counted in the reset section (i.e., the reset code) from the value counted in the signal section during the test mode as an output counting value.

In operation S30, the test circuit 180 may determine whether the counter operates normally based on a comparison result between the output counting value from the counter and the test code.

In some embodiments, the test circuit 180 may determine whether the counter operates normally based on a comparison result between the output counting value from the counter and the expected test code. The expected test code may be a code substantially identical or similar to the test code.

In some embodiments, if the output counting value of the counter circuit 144 and the test code (or expected test code) coincide, the test circuit 180 may output, for example, a logic high level H indicating a counting operation pass to the test terminal 187.

In some embodiments, when the output counting value of the counter circuit 144 and the test code do not coincide, a logic low level L indicating a counting operation fail may be output to the test terminal 187.

As the image sensor including the test circuit 180 according to some embodiments may monitor the logic level output to the test terminal 187, it may be immediately checked whether the counting operation of the counter circuit 144 is normally operating.

Figure 5:
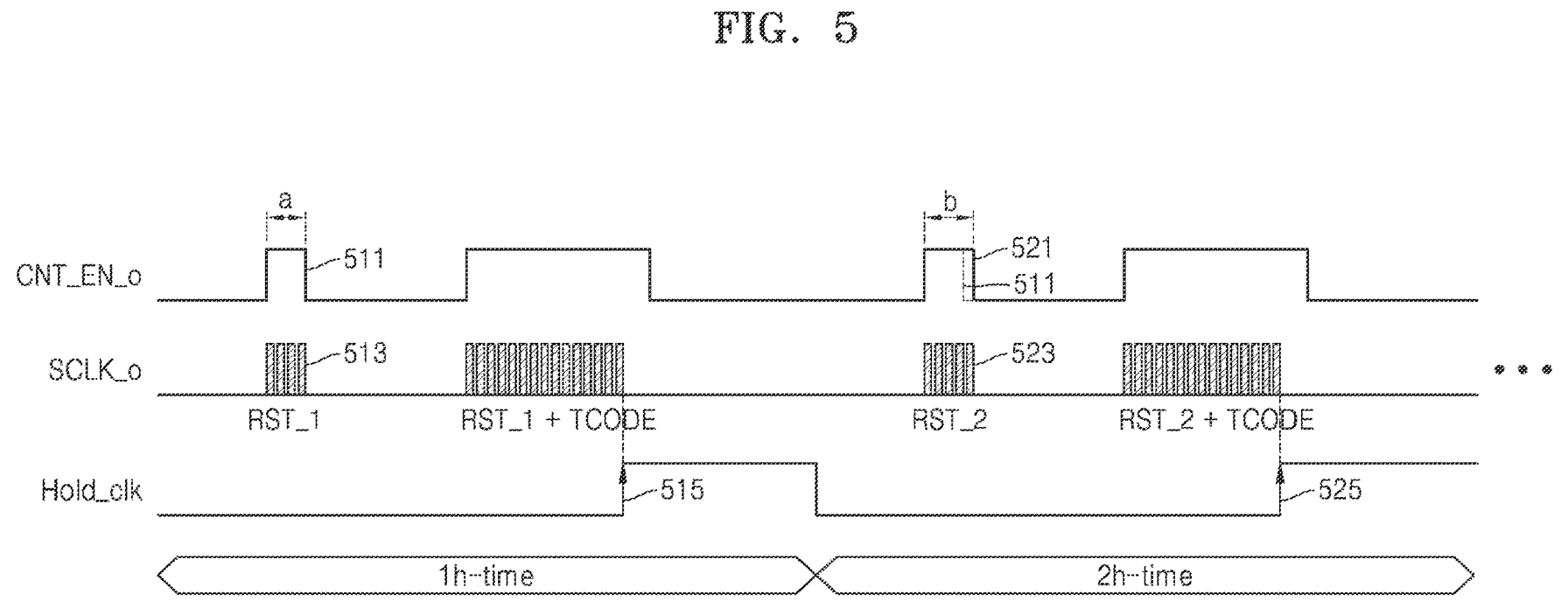

FIG. 5 is a diagram illustrating an operation of changing a reset code according to some embodiments.

Referring to FIG. 5, the test circuit 180 may test the counters according to the count enable signal CNT_EN (e.g., basic count enable signal CNT_EN), the count clock signal SCLK_o, and the clock hold signal Hold_clk every horizontal time period h-time. Counting values in the reset section and signal section of the test mode may have a dominant effect on the counting test. Therefore, if the test circuit 180 changes the reset code, which is the counting value in the reset section, to gradually increase or decrease every horizontal time period, compared to tests based on existing fixed reset codes, it would be possible to improve the test coverage of the test circuit 180 by detecting errors in various counting operations.

In the present specification, a horizontal time period (e.g., 1 h-time) in the test mode may refer to a time required to perform one test for a counting operation of all counters included in the ADC in the test mode. For example, the horizontal time period may refer to a period from the time point at which the clock hold signal transitions from high level to low level in the signal section of the previous horizontal time period to the time point at which the clock hold signal transitions from a high level to a low level in the signal section of the next horizontal time period.

In some embodiments, the test circuit 180 of FIG. 2 may change the count enable signal CNT_EN by the count enable controller 188, and generate the count clock signal SCLK_o according to the count enable signal CNT_EN_o changed by the clock controller 185.

In some embodiments, the count enable controller 188 may change the count enable signal CNT_EN of reset sections (e.g., the first reset section 511 and the second reset section 521) every horizontal time period h-time.

For example, the count enable controller 188 may phase-shift the count enable signal CNT_EN (e.g., basic count enable signal CNT_EN) to sequentially increase the count enable signal CNT_EN every horizontal time period h-time. The count enable controller 188 may phase-modulate the count enable signal CNT_EN to sequentially decrease the count enable signal CNT_EN every horizontal time period h-time. A detailed description of this will be given later with reference to FIGS. 6A to 7B. For example, referring to FIG.

Figure 6A:
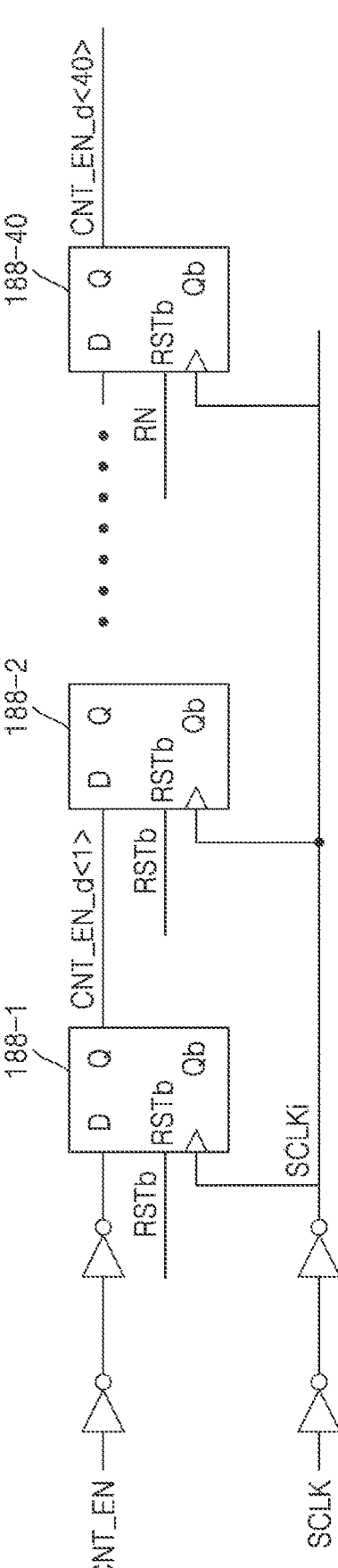
FIG. 6A is a circuit diagram specifically illustrating the count enable controller shown in FIG. 2 according to some embodiments.

6A (FIG. 6A may show a shift register (with sequentially connected flip-flops) operating with the count enable signal CNT_EN as input and the clock signal SCLK as clock.), the count enable signal CNT_EN is delayed by a period of the clock signal SCLK through the first flip-flop 188-1 and outputted as the first count enable delay signal CNT_EN_d<1>. And the first count enable delay signal CNT_EN_d<1> may represent a signal generated by phase-shifting the count enable signal CNT_EN (wherein the count enable signal CNT_EN is assumed to be a periodic signal). The second count enable delay signal CNT_EN_d<2> in FIG. 6A may represent a signal generated by phase-shifting the first count enable delay signal CNT_EN_d<1>.

In some embodiments, the clock controller 185 may generate the count clock signal SCLK_o by masking the changed count enable signal CNT_EN_o to the clock signal SCLK.

In some embodiments, in the first horizontal time period 1 h-time, the clock controller 185 may generate the first count clock signal SCLK_o 513 based on the first count enable signal CNT_EN_o 511. The counter may output the value counted according to the first count clock signal SCLK_o 513 in the reset section of the first horizontal time period 1 h-time as a first reset code RST_1, and in the signal section, the counter may count up to the time point at which the first clock hold signal Hold_clk 515 transitions from low level to high level and output the value counted according to the first count clock signal SCLK_o 513 as the first image code RST_1+TCODE. The test circuit 180 may determine whether the counter operates normally based on a comparison result between the value obtained by subtracting the first reset code RST_1 from the first image code RST_1+TCODE and the test code TCODE.

In some embodiments, in the second horizontal time period 2 h-time, the clock controller 185 may generate the second count clock signal SCLK_o 523 based on the second count enable signal CNT_EN_o 521. In this case, the second count enable signal CNT_EN_o 521 may be changed into a signal different from the first count enable signal CNT_EN_o 513 through phase modulation by the count enable controller 188. For example, through phase modulation by the count enable controller 188, the length (time period) 'b' of the second count clock signal SCLK_o 523 may be longer or shorter than the length 'a' of the first count clock signal SCLK_o 513. The counter may output the value counted by the counter according to the second count clock signal SCLK_o 523 as a second reset code RST_2 in the reset section of the second horizontal time period 2 h-time, and in the signal section, the counter may count up to the time point at which the second clock hold signal Hold_clk 525 transitions from low level to high level and may output the value counted according to the second count clock signal SCLK_o 523 as the second image code RST_2+TCODE. The test circuit 180 may determine whether the counter operates normally based on a comparison result between the value obtained by subtracting the second reset code RST_2 from the second image code RST_2+TCODE and the test code TCODE.

As the test circuit of the image sensor according to some embodiments may sequentially increase or decrease the reset code, which is the counting value of the reset section, every horizontal time period, the accuracy of the test may be improved by detecting various errors of the counter.

FIG. 6A is a circuit diagram specifically illustrating the count enable controller shown in FIG. 2 according to some embodiments.

Referring to FIG. 6A, the count enable controller 188 of FIG. 2 may include a plurality of flip-flops (e.g., a first flip-flop 188-1 to a 40th flip-flop 188-40) and a plurality of inverter circuits. However, the embodiments of the numbers of the plurality of flip-flops and the plurality of inverter circuits are not limited thereto. When the inverted clock signal SCLKi (e.g., 1≤i≤40), the inverted count enable signal CNT_EN, and the pulse signal RSTb or RN are input to each of the first flip-flop 188-1 to the 40th flip-flop 188-40, the first flip-flop 188-1 to the 40th flip-flop 188-40 may output the first count enable delay signal CNT_EN_d<1> to the 40th count enable delay signal CNT_EN_d<40>.

In some embodiments, the count enable controller 188 may receive the count enable signal CNT_EN and the clock signal SCLK and generate the changed count enable signal CNT_EN_o, for example, by sequentially delaying the count enable signal CNT_EN by the cycle of the clock signal SCLK every one horizontal time period h-time using the first count enable delay signal CNT_EN_d<1> to the 40th count enable delay signal CNT_EN_d<40>.

In the present specification, a horizontal time period (e.g., 1 h-time) in the test mode may refer to a time required to perform one test for a counting operation of all counters included in the ADC in the test mode.

Figure 6B:
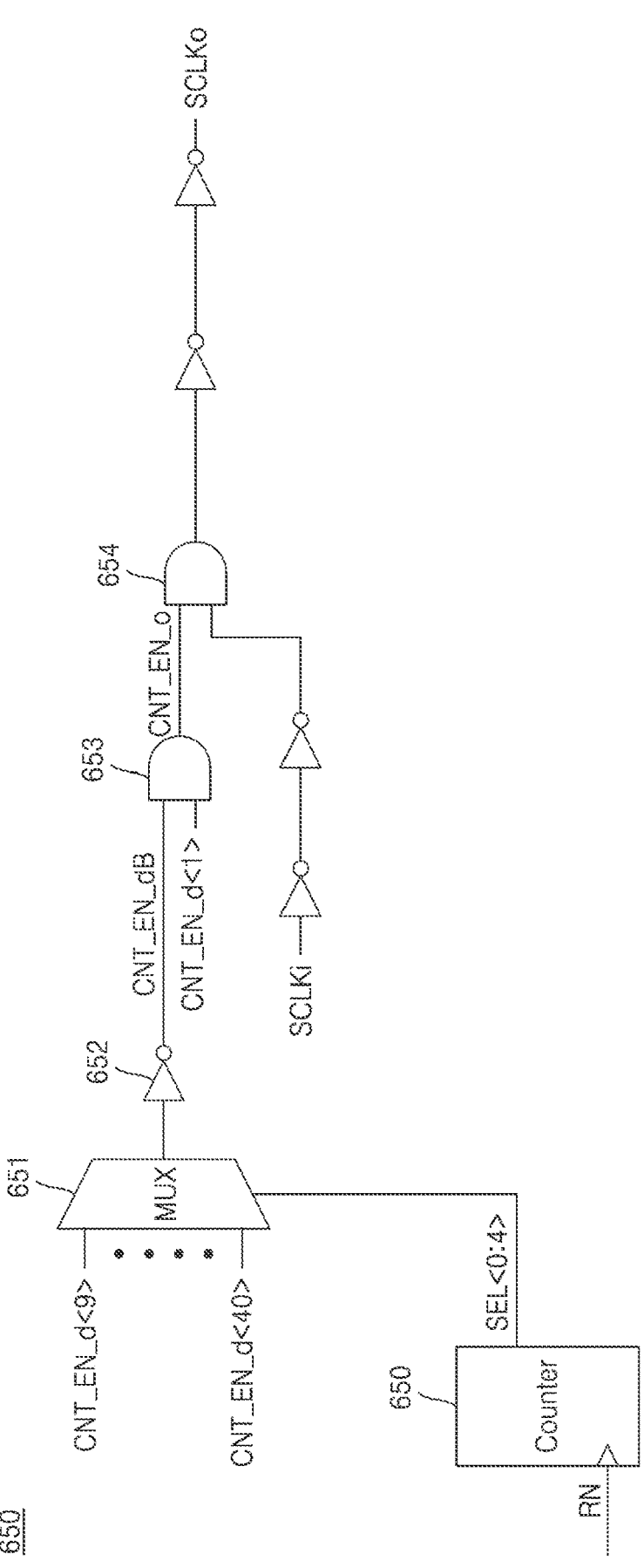
FIG. 6B is a circuit diagram for changing a reset code in the count enable controller of FIG. 6A according to some embodiments.

FIG. 6B is a circuit diagram for changing a reset code in the clock controller of FIG. 6A according to some embodiments.

Referring to FIG. 6B, the clock controller 185 of FIG. 2 may change the reset code, for example, by delaying the count enable signal CNT_EN using the ninth count enable delay signal CNT_EN_d<9> to the 40th count enable delay signal CNT_EN_d<40> among the count enable delay signals of the count enable controller 188 of FIG. 6A. However, the embodiments of changing the reset code are not limited thereto.

In FIG. 6B, the count enable controller 188 is described as a component included in the clock controller 185, but is not limited thereto and may be configured as an external circuit of the clock controller 185 according to various embodiments.

In some embodiments, the counter 650 may receive a pulse signal RN that toggles once in one horizontal time period and sequentially increase and output selection signals SEL (e.g., '00000', '00001', . . . , '11111'). For example, in the first horizontal time period 1 h-time, the counter 650 may output a selection signal SEL '00000', and in the second horizontal time period 2 h-time, the counter 650 may output a selection signal SEL '00001'.

In some embodiments, the multiplexer 651 (or multiplexing circuit) may receive a selection signal SEL that sequentially increases every horizontal time period according to the pulse signal RN and sequentially output the ninth count enable delay signal CNT_EN_d<9> to the 40th count enable delay signal CNT_EN_d<40>. The output signal of the multiplexer 651 may be input to the first operator 653 as an inverted count enable delay signal CNT_EN_dB through the inverter 652.

In some embodiments, the clock controller 185 may generate the modified count enable signal CNT_EN_o by an AND operation of the first count enable delay signal CNT_EN_d<1>, which is the reference count enable signal, and the inverted count enable delay signal CNT_EN_dB through the first operator 653.

In some embodiments, the clock controller 185 may perform an AND operation on the clock signal SCLKi and the changed count enable signal CNT_EN_o through the fourth operator 654 and generate the count clock signal SCLK_o by masking the count enable signal CNT_EN_o with the clock signal SCLKi.

According to an embodiment, the operation of sequentially increasing or decreasing the reset code according to the horizontal time period using the circuit diagram of the clock controller 185 and the count enable controller 188 of FIGS. 6A and 6B will be described with reference to FIGS. 7A and 7B.

Figure 7A:
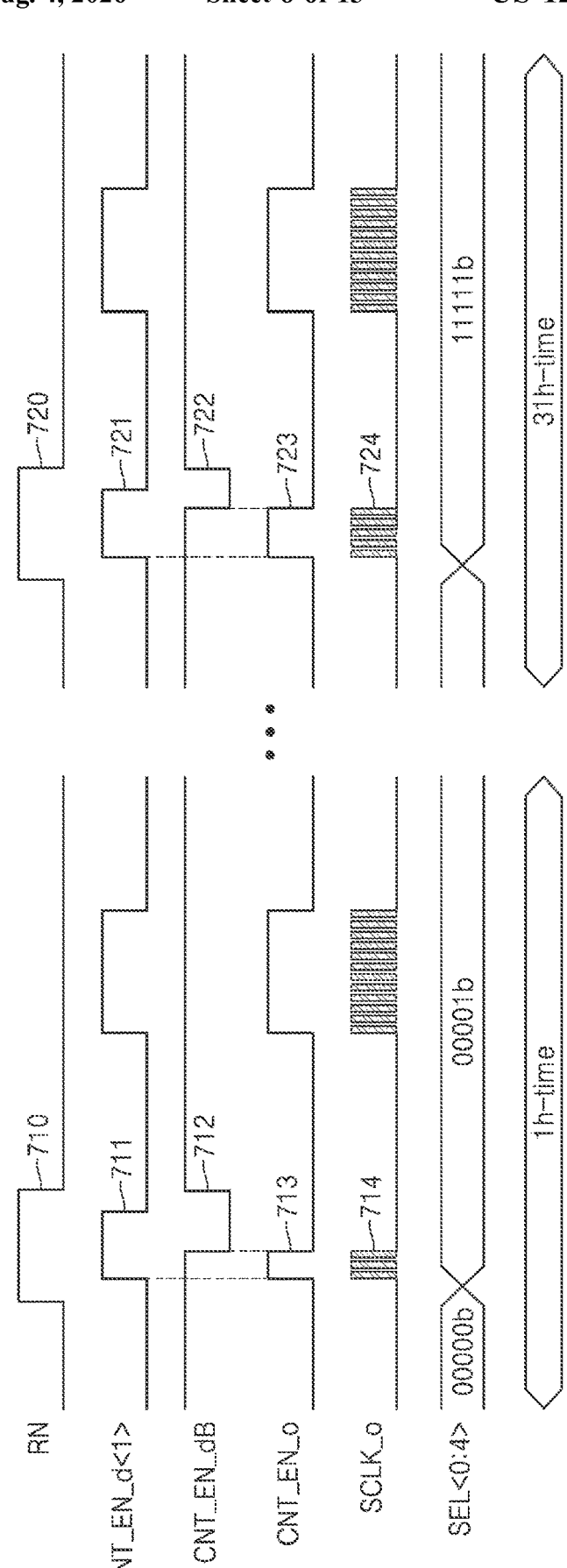
FIGS. 7A and 7B are timing diagrams for explaining a reset code change operation shown in FIG. 6B according to some embodiments.
Figure 7B:
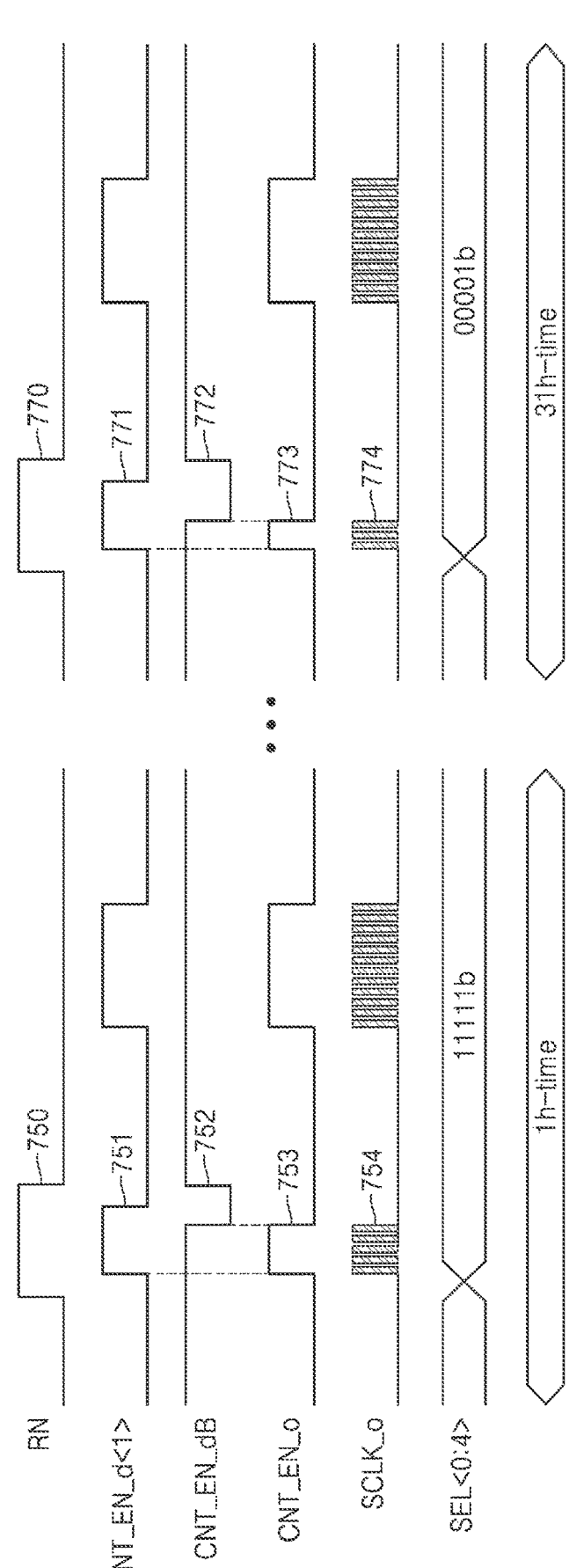

FIGS. 7A and 7B are timing diagrams for explaining a reset code change operation shown in FIG. 6B according to some embodiments.

In detail, FIGS. 7A and 7B are timing diagrams for explaining operations of changing the reset code by gradually increasing or decreasing the reset code every horizontal time period using the clock controller 185 and the count enable controller 188 of FIGS. 6A and 6B.

In the present specification, a horizontal time period (e.g., 1 h-time) in the test mode may refer to a time required to perform one test for a counting operation of all counters included in the ADC in the test mode. For example, the horizontal time period may refer to a period from the time point at which the clock hold signal transitions from high level to low level in the signal section of the previous horizontal time period to the time point at which the clock hold signal transitions from a high level to a low level in the signal section of the next horizontal time period.

Referring to FIGS. 7A and 7B, the clock controller 185 and the count enable controller 188 may change a pulse signal RN, a first count enable delay signal CNT_EN_d<1> as a reference count enable signal, an inverted count enable delay signal CNT_EN_dB, a count clock signal SCLK_o, and a reset code in a selection signal SEL<0:4> every horizontal time period h-time.

FIG. 7A is a timing diagram for explaining an operation of gradually increasing a reset code every horizontal time period by the clock controller 185 and the count enable controller 188. As the selection signal SEL<0:4> increases by 1 for each horizontal time period, the count delay signal may be sequentially output from, for example, the ninth count enable delay signal CNT_EN_d<9> to the 40th count enable delay signal CNT_EN_d<40> to generate the changed count enable signal CNT_EN_o. That is, as the selection signal SEL<0:4> increases by 1, the length (time period) of the count clock SCLK_o according to the count enable signal CNT_EN_o may gradually increase.

In the case of FIG. 7A, in some embodiments, as the pulse signal RN 710 transitions to a high level in the first horizontal time period 1 h-time, the count enable controller 188 may perform an AND operation on a first count enable delay signal CNT_EN_d<1>711, which is a reference count enable signal, and an inverted count enable delay signal CNT_EN_dB 712 to change the default count enable signal CNT_EN to the (changed) count enable signal CNT_EN_o 713. At this time, the inverted count enable delay signal CNT_EN_dB 712 may be an inverted signal of the ninth count enable delay signal CNT_EN_d<9> corresponding to '00001b' of the selection signal SEL<0:4>. The clock controller 185 may generate the count clock signal SCLK_o 714 by masking the changed count enable signal CNT_EN_o 713 with the clock signal SCLK. The counter may output a value counted according to the count clock signal SCLK_o 714 in the reset section as a first reset code.

In some embodiments, as the pulse signal RN 720 transitions to a high level in the 31st horizontal time period 31 h-time, the count enable controller 188 performs an AND operation on a first count enable delay signal CNT_EN_d<1>721, which is a reference count enable signal, and an inverted count enable delay signal CNT_EN_dB 722 to change the default count enable signal CNT_EN to the (changed) count enable signal CNT_EN_o 723. At this time, the inverted count enable delay signal CNT_EN_dB 722 may be an inverted signal of the 40th count enable delay signal CNT_EN_d<40> corresponding to the selection signal SEL<0:4>'11111b'. The clock controller 185 may generate the count clock signal SCLK_o 724 by masking the changed count enable signal CNT_EN_o 723 with the clock signal SCLK. The counter may output a value counted according to the count clock signal SCLK_o 724 in the reset section as a 31st reset code.

As shown in FIG. 7A, the clock controller 185 and the count enable controller 188 of the test circuit according to the embodiment may change the delay period of the count enable signal CNT_EN to increase every horizontal time period, and gradually increase the reset code based on the changed count enable signal CNT_EN_o.

In the case of FIG. 7B, in some embodiments, as the pulse signal RN 750 transitions to a high level in the first horizontal time period 1 h-time, the count enable controller 188 may perform an AND operation on a first count enable delay signal CNT_EN_d<1>751, which is a reference count enable signal, and an inverted count enable delay signal CNT_EN_dB 752 to change the default count enable signal CNT_EN to the (changed) count enable signal CNT_EN_o 753. At this time, the inverted count enable delay signal CNT_EN_dB 752 may be an inverted signal of the 40th count enable delay signal CNT_EN_d<40> corresponding to the selection signal SEL<0:4>'11111b'. The clock controller 185 may generate the count clock signal SCLK_o 754 by masking the changed count enable signal CNT_EN_o 753 with the clock signal SCLK. The counter may output a value counted according to the count clock signal SCLK_o 754 in the reset section as a first reset code.

In some embodiments, as the pulse signal RN 770 transitions to a high level in the 31st horizontal time period 31 h-time, the count enable controller 188 may perform an AND operation on a first count enable delay signal CNT_EN_d<1>771, which is a reference count enable signal, and an inverted count enable delay signal CNT_EN_dB 772 to change the default count enable signal CNT_EN to the (changed) count enable signal CNT_EN_o 773. At this time, the inverted count enable delay signal CNT_EN_dB 772 may be an inverted signal of the ninth count enable delay signal CNT_EN_d<9> corresponding to '00001b' of the selection signal SEL<0:4>. The clock controller 185 may generate the count clock signal SCLK_o 774 by masking the changed count enable signal CNT_EN_o 773 with the clock signal SCLK. The counter may output a value counted according to the count clock signal SCLK_o 774 in the reset section as a 31st reset code.

As shown in FIG. 7B, the clock controller 185 and the count enable controller 188 of the test circuit 180 according to the embodiment may change the delay period of the count enable signal CNT_EN to decrease every horizontal time period, and gradually decrease the reset code based on the changed count enable signal CNT_EN_o.

Therefore, according to the image sensor and the test circuit and the test method according to the embodiment, by changing the reset code to constantly increase or decrease every horizontal time period, test coverage may be increased in preparation for various defects inside the counter, thereby improving the accuracy of test results.

Figure 8:
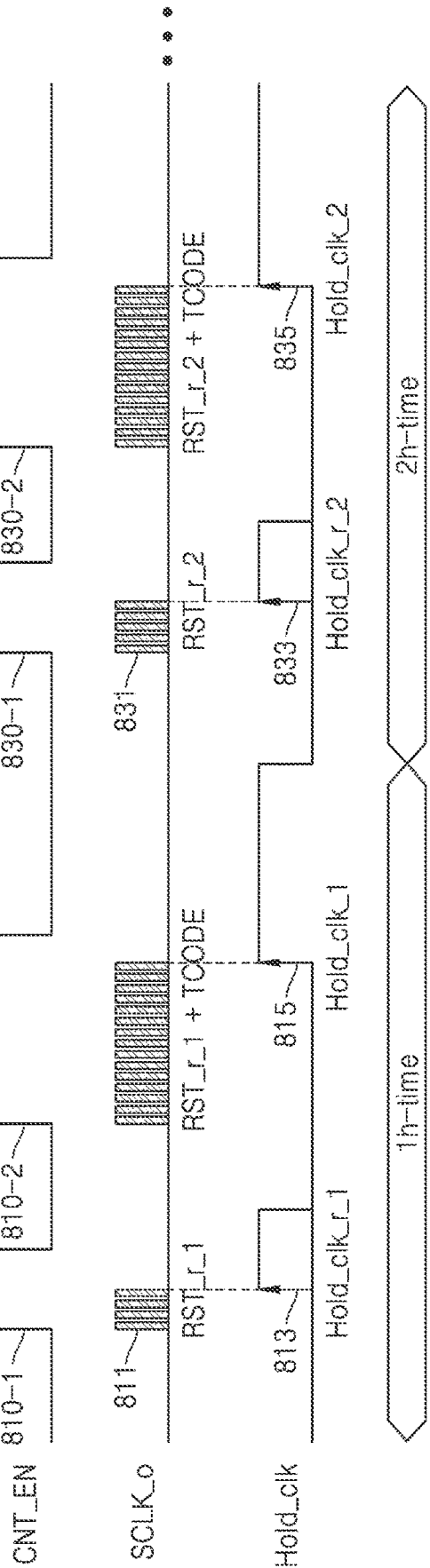
FIG. 8 is a diagram illustrating an operation of changing a reset code based on a random code according to some embodiments.

FIG. 8 is a diagram illustrating an operation of changing a reset code based on a random code according to some embodiments.

Referring to FIG. 8, the test circuit 180 of FIG. 2 may test the counters according to the count enable signal CNT_EN, the count clock signal SCLK_o, and the clock hold signal Hold_clk every horizontal time period h-time. During the test mode, the counting values in the reset section and signal section have a dominant influence on the operation test of the counter. Therefore, if the test circuit 180 may change the reset code, which is the counting value in the reset section, to a random value every horizontal time period, compared to conventional tests based on fixed reset codes, it is possible to improve the test coverage of the test circuit 180 by detecting errors in various counting operations.

In the present specification, a horizontal time period (e.g., 1 h-time) in the test mode may refer to a time required to perform one test for a counting operation of all counters included in the ADC in the test mode. For example, the horizontal time period may refer to a period from the time point at which the clock hold signal transitions from high level to low level in the signal section of the previous horizontal time period to the time point at which the clock hold signal transitions from high level to low level in the signal section of the next horizontal time period.

In some embodiments, the reset test block 189 of the test circuit 180 of FIG. 2 may generate a random code every horizontal time period h-time, and when the value counted by the counter according to the count clock signal SCLK_o in the reset section and the random code coincide, may hold the count clock signal SCLK_o of the reset section through the reset clock hold signal (e.g., the first reset clock hold signal Hold_clk_r_1 813 and the second reset clock hold signal Hold_clk_r_2 833) to change the reset code to a random counting value every horizontal time period.

In the case of the first horizontal time period 1 h-time according to an embodiment, when the value counted according to the count clock signal SCLK_o in the section corresponding to the first random code and the count enable signal CNT_EN 810-1 coincide, the reset test block 189 may hold the count clock signal SCLK_o by generating the first reset clock hold signal Hold_clk_r_1 813. The counter may output a value obtained by counting the count clock signal SCLK_o up to the generation time point of the first reset clock hold signal Hold_clk_r_1 813 as the changed reset code RST_r_1. In this case, the generation time point of the first reset clock hold signal Hold_clk_r_1 813 may refer to a time point at which the first reset clock hold signal Hold_clk_r_1 813 transitions from a low level to a high level.

The test circuit 180 may determine whether the counter operates normally in the signal section corresponding to the count enable signal CNT_EN 810-2 based on the comparison result between the value obtained by subtracting the reset code RST_r_1 from the image code RST_r_1+TCODE, which is the value counted by the counter according to the clock hold signal Hold_clk_1 and the count clock signal SCLK_o, and the test code TCODE.

In the case of the second horizontal time period 2 h-time according to an embodiment, when the value counted according to the count clock signal SCLK_o in the section corresponding to the second random code and the count enable signal CNT_EN 830-1 coincide, the reset test block 189 may hold the count clock signal SCLK_o by generating the second reset clock hold signal Hold_clk_r_2 833. The counter may output a value obtained by counting the count clock signal SCLK_o until the generation time point of the second reset clock hold signal Hold_clk_r_2 833 as the changed reset code RST_r_2. In this case, the generation time point of the second reset clock hold signal Hold-_clk_r_2 833 may refer to a time point at which the second reset clock hold signal Hold_clk_r_2 833 transitions from a low level to a high level.

The test circuit 180 may determine whether the counter operates normally in the signal section corresponding to the count enable signal CNT_EN 830-2 based on the comparison result between the value obtained by subtracting the reset code RST_r_2 from the image code RST_r_2+ TCODE, which is the value counted by the counter according to the clock hold signal Hold_clk_2 and the count clock signal SCLK_o, and the test code TCODE.

Detailed internal configurations of the reset test block 189 will be described with reference to FIGS. 9A and 9B later.

Figure 9A:
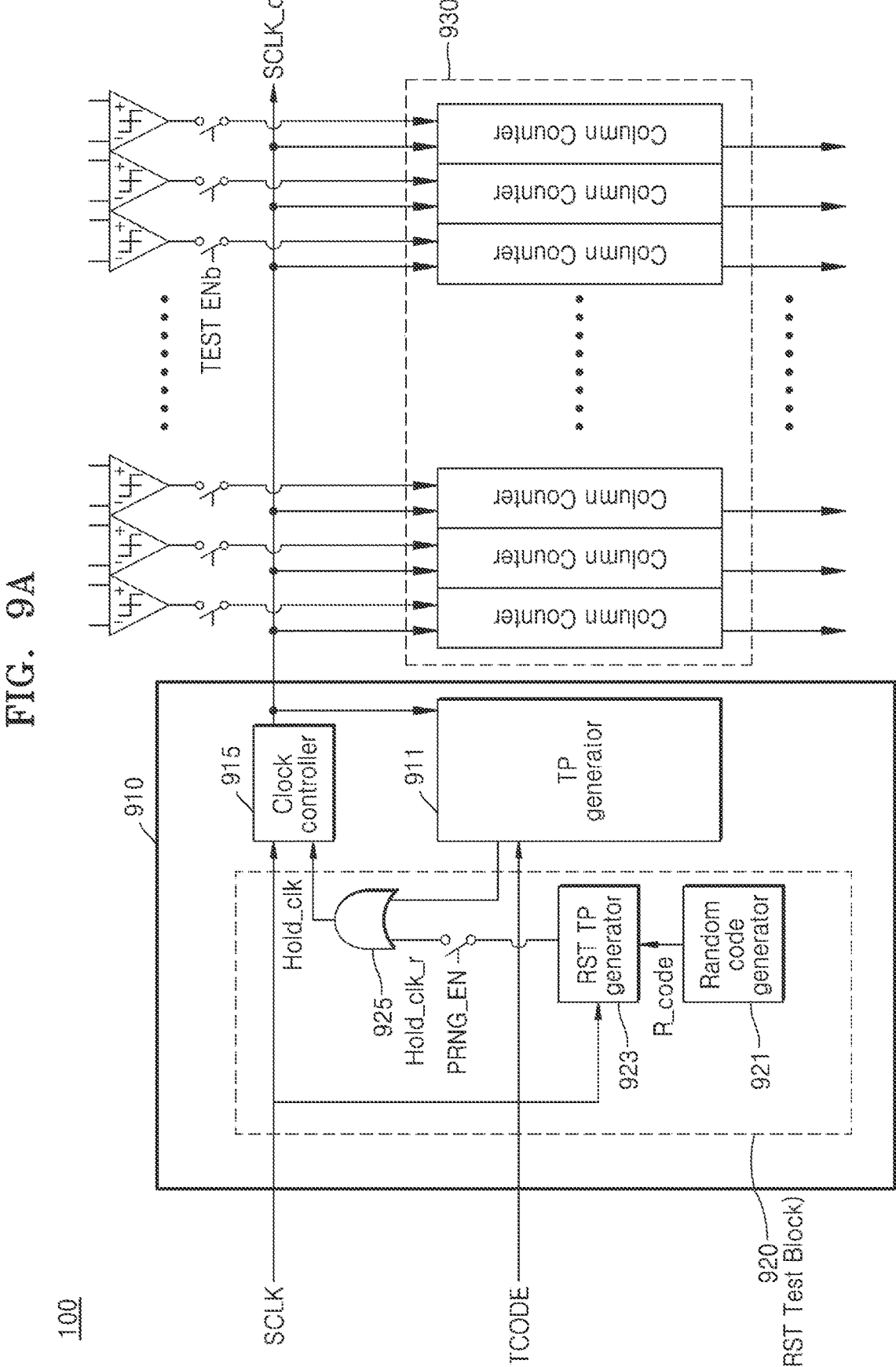
FIG. 9A is a block diagram specifically illustrating a reset test block of a test circuit according to some embodiments.

FIG. 9A is a block diagram specifically illustrating a reset test block of a test circuit according to some embodiments.

In detail, a reset test block 920 may be in the test circuit 910 of the image sensor 100 in FIG. 2. In FIG. 9A, when the test mode signal TEST_ENb is input, a switch between the comparator circuit and the counter circuit 930 of the image sensor 100 is opened so that the image sensor 100 may operate in the test mode. The test circuit 910 of FIG. 9A may correspond to the test circuit 180 of FIG. 2. The counter circuit 930 may correspond to the counter circuit 144 in FIG. 2.

In the test mode, the test pattern generator 911 may receive the test code TCODE through the clock controller 915, and the clock controller 915 may generate the count clock signal SCLK_o by masking the clock signal SCLK based on the test code TCODE and the count enable signal. The counter circuit 930 may output a value counted according to the count clock signal SCLK_o in the reset section as a reset code.

In the present specification, a horizontal time period (e.g., 1 h-time) in the test mode may refer to a time required to perform one test for a counting operation of all counters included in the ADC in the test mode. For example, the horizontal time period may refer to a period from the time point at which the clock hold signal transitions from high level to low level in the signal section of the previous horizontal time period to the time point at which the clock hold signal transitions from a high level to a low level in the signal section of the next horizontal time period.

Referring to FIG. 9A, the reset test block 920 may include a random code generator 921, a reset test pattern (TP) generator 923, and a hold signal operator 925.

In some embodiments, the random code generator 921 may generate a random code R_code based on a random number every horizontal time period and transmit the generated random code R_code to the reset TP generator 923. The reset TP generator 923 may generate a reset clock hold signal Hold_clk_r when a value counted according to the count clock signal SCLK_o in the reset section matches the random code R_code. The hold signal operator 925 may transmit the reset clock hold signal Hold_clk_r received from the reset TP generator 923 to the clock controller 915 when the random test mode signal PRNG_EN is input. The hold signal operator 925 may transmit the clock hold signal Hold_clk generated by the test pattern generator 911 to the clock controller 915 when the random test mode signal PRNG_EN is not input (e.g., the test mode signal section). By holding the count clock signal SCLK_o at the generation time point of the reset clock hold signal Hold_clk_r in the reset section, the counter circuit 930 may output the counting value held at the generation time point of the reset clock hold signal Hold_clk_r as a changed reset code. In this case, the generation time point of the reset clock hold signal Hold_clk_r may refer to a time point at which the reset clock hold signal Hold_clk_r transitions from a low level to a high level.

Figure 9B:
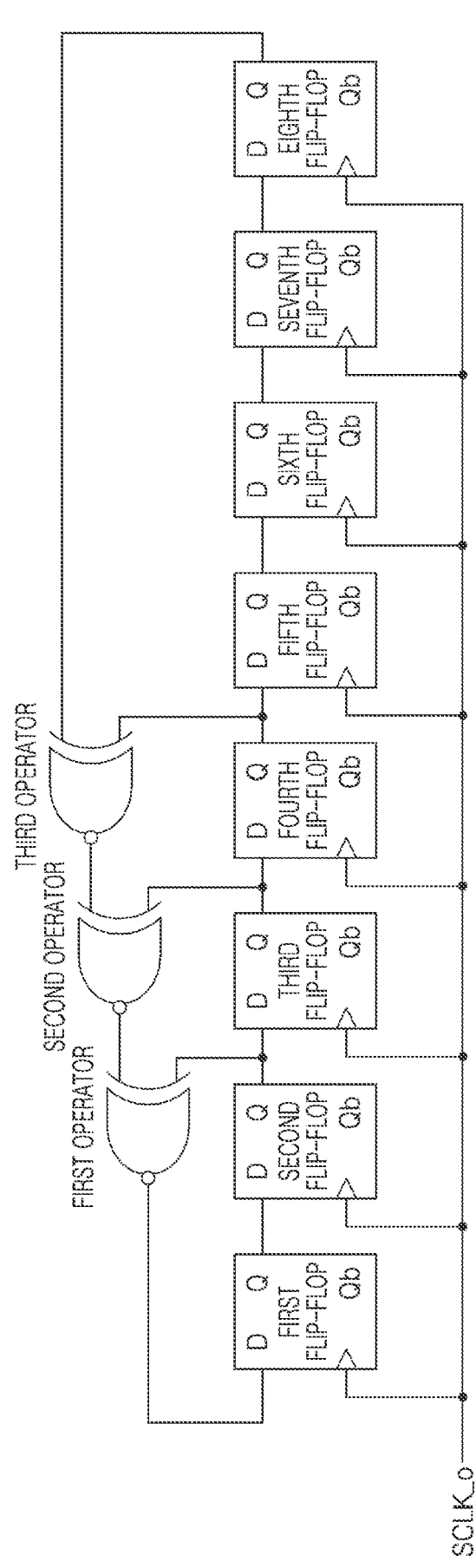
FIG. 9B is a circuit diagram specifically illustrating the random code generator shown in FIG. 9A according to some embodiments.

FIG. 9B is a circuit diagram specifically illustrating the random code generator shown in FIG. 9A according to some embodiments.

Referring to FIG. 9B, the random code generator 921 of FIG. 9A may include, for example, first to eighth flip-flops and first to third operators. However, the embodiments of the numbers of the flip-flops and the operators are not limited thereto.

In some embodiments, the random code generator 921 may generate a random code R_code corresponding to a random number code of the count clock signal SCLK_o input every horizontal time period by using the first to eighth flip-flops and the first to third operators. For example, the random code generator 921 may perform a first operation on the output value of the fourth flip-flop and the output value of the eighth flip-flop according to the count clock signal SCLK_o through a third operator, perform a second operation on the output value of the third operator and the output value of the third flip-flop through the second operator, perform a third operation on the output value of the second operator and the output value of the second flip-flop through the first operator, and generate a random code having a random number value according to the count clock signal SCLK_o every horizontal time period by re-inputting the output value of the first operator into the first flip-flop.

The configuration of the random code generator 921 of FIG. 9B is an example embodiment of the random code generator 921, and is not limited thereto, and the random code generator 921 may be configured with various circuits according to various embodiments.

According to an image sensor and a test circuit and a test method thereof according to some embodiments, by changing the reset code to a random value every horizontal time period, test coverage may be increased in preparation for various defects inside the counter, thereby improving the accuracy of test results.

Figure 10:
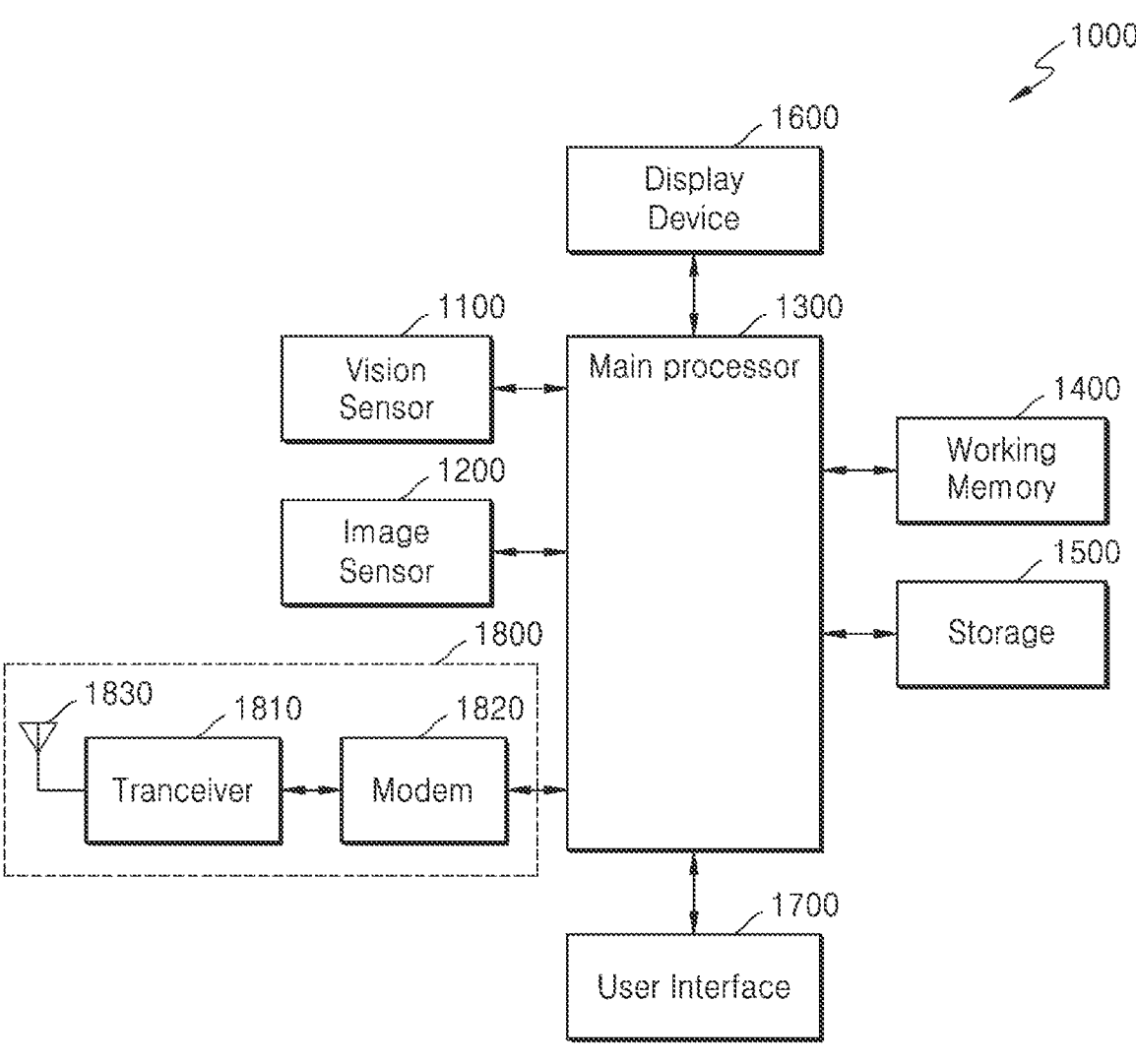
FIG. 10 is a block diagram illustrating an electronic device to which an image sensor including a test circuit according to some embodiments is applied.

FIG. 10 is a block diagram illustrating an electronic device to which an image sensor including a test circuit according to some embodiments is applied.

Referring to FIG. 10, an electronic device 1000 may include a vision sensor 1100, an image sensor 1200, a main processor 1300, a working memory 1400, a storage 1500, a display device 1600, a user interface 1700, and a communication unit 1800. Meanwhile, the inventive concept is not limited thereto, and the electronic device 1000 may be implemented such that at least some of the aforementioned components are omitted or additional components are added.

The image sensor 100 including the test circuit 180 described with reference to FIGS. 1 to 9B may be applied as the image sensor 1200.

The vision sensor 1100 may sense an object to generate event signals and transmit the generated event signals to the main processor 1300.

The image sensor 1200 may generate image data, for example, raw image data, based on the received optical signal and provide the image data to the main processor 1300.

The main processor 1300 may control the overall operation of the electronic device 1000, and when a malfunction of the image sensor 1200 is detected, transmit a test mode signal including a test code to the image sensor 1200 to control the image sensor 1200 to operate in the test mode.

Upon receiving the test mode signal, the image sensor 1200 may drive a test circuit for determining whether the counting operation of the image sensor 1200 is normal. The test circuit may change the reset code, which is the value obtained by counting the count clock signal in the reset section of the test mode, every horizontal time period to determine whether an error occurs in the counting operation of the counter based on the changed reset code. If the value obtained by subtracting the reset code from the image code, which is the counting value of the signal section during the test mode, does not match the test code, the test circuit may output a test result indicating that an error has occurred in the counting operation of the counter.

The working memory 1400 may store data used for the operation of the electronic device 1000. For example, the working memory 1400 may temporarily store packets or frames processed by the main processor 1300. The working memory 1400 may temporarily store counting values of a reset section or a signal section for determining whether a test circuit of the image sensor 1200 generates an error in a counting operation of a counter.

For example, the working memory 1400 may include, for example, volatile memory, such as Dynamic Random-Access Memory (RAM) (DRAM), Synchronous RAM (SDRAM), and the like, and/or non-volatile memory, such as phase-change RAM (PRAM), magneto-resistive RAM (MRAM), resistive RAM (ReRAM), ferro-electric RAM (FRAM), and the like.

The storage 1500 may store data requested to be stored from the main processor 1300 or other elements. The storage 1500 may include, for example, nonvolatile memory, such as flash memory, PRAM, MRAM, ReRAM, FRAM, and the like.

The display device 1600 may include, for example, a display panel, a display driving circuit, and a display serial interface (DSI). For example, the display panel may be implemented with various devices such as a liquid crystal display (LCD) device, a light emitting diode (LED) display device, an organic LED (OLED) display device, and an active matrix OLED (AMOLED) display device, but is not limited thereto. The display driving circuit may include a timing controller and a source driver necessary for driving the display panel. The DSI host built into the main processor 1300 may perform serial communication with the display panel through the DSI.

The user interface 1700 may include at least one of input interfaces, such as a keyboard, mouse, keypad, button, touch panel, touch screen, touch pad, touch ball, gyroscope sensor, vibration sensor, and acceleration sensor. However, the embodiments of the input interfaces are not limited thereto.

The communication unit 1800 may exchange signals with an external device/system through the antenna 1830. The transceiver 1810 and the modulator/demodulator (MODEM) 1820 of the communication unit 1800 may process signals exchanged with external devices/systems in accordance with wireless communication protocols, such as Long Term Evolution (LTE), Worldwide Interoperability for Microwave Access (WIMAX), Global System for Mobile communication (GSM), Code Division Multiple Access (CDMA), Bluetooth, Near Field Communication (NFC), Wireless Fidelity (Wi-Fi), Radio Frequency Identification (RFID), and the like.

Components of the electronic device 1000, for example, the vision sensor 1100, the image sensor 1200, the main processor 1300, the working memory 1400, the storage

1500, the display device 1600, the user interface 1700, and the communication unit 1800, may exchange data based on one or more of the various interface protocols, such as Universal Serial Bus (USB), Small Computer System Interface (SCSI), MIPI, I2C, Peripheral Component Interconnect Express (PCIe), Mobile PCIe (M-PCIe), Advanced Technology Attachment (ATA), Parallel ATA (PATA), Serial ATA (SATA), Serial Attached SCSI (SAS), Integrated Drive Electronics (IDE), Enhanced IDE (EIDE), Nonvolatile Memory Express (NVMe), Universal Flash Storage (UFS), and the like.

While the inventive concept has been particularly shown and described with reference to embodiments thereof, it will be understood that various changes in form and details may be made therein without departing from the spirit and scope of the following claims.

What is claimed is:

1. An image sensor comprising:
   a pixel array that includes a plurality of pixels, wherein each of the plurality of pixels is configured to generate an analog signal in response to incident light;
   an analog-to-digital converter that includes a counter, wherein the analog-to-digital converter is configured to convert the analog signal into a digital signal; and
   a test circuit that is configured to:
      periodically change a reset code according to a horizontal time period, wherein changing the reset code comprises determining a value of the reset code at least in part by:
         determining a first counting value during a reset time period of a test mode according to a count clock signal, and
         assigning the determined first counting value as the value of the reset code;
   wherein the test circuit is configured to test a counting operation of the counter based on the reset code that changes according to the horizontal time period.

2. The image sensor of claim 1, wherein the test circuit is configured to
   generate the count clock signal according to a clock signal,
   generate and transmit a count enable signal of the test mode to the counter, and
   compare a second counting value with a test code,
   wherein the second counting value is obtained by subtracting the reset code from an image code,
   wherein the image code is a counting value during a signal time period of the test mode, and
   wherein the signal time period corresponds to the count enable signal of the test mode.

3. The image sensor of claim 2, wherein the test circuit is configured to
   change a count enable signal of the reset time period into a changed count enable signal of the reset time period by performing a phase-shift on the count enable signal of the reset time period, and
   change the count clock signal by masking the changed count enable signal on a clock signal of the reset time period.

4. The image sensor of claim 3, wherein the test circuit is configured to gradually increase or gradually decrease a length of time of the count enable signal of the reset time period by performing the phase-shift on the count enable signal of the reset time period every horizontal time period.

5. The image sensor of claim 2, wherein the test circuit further comprises a reset test block, wherein the reset test block comprises:

a random code generator that is configured to generate a random code based on a random number generated for each horizontal time period; and a reset test pattern generator that is configured to receive the random code, wherein the reset test pattern generator is configured to compare the reset code with the random code and change the reset code based on a comparison result between the reset code and the random code.

6. The image sensor of claim 5, wherein, the reset test pattern generator is configured to generate a reset clock hold signal when the reset code and the random code are equal to each other, and wherein, the counter is configured to count until an end time point of the reset time period or a time point of the reset clock hold signal that is earlier than the end time point of the reset time period.

7. The image sensor of claim 6, wherein, the reset test block is configured to transmit the reset clock hold signal to a clock controller of the test circuit when the reset code and the random code are equal to each other, wherein the clock controller is configured to hold the count clock signal of the reset time period according to the reset clock hold signal, wherein the counter is configured to output a third counting value of the count clock signal of the reset time period that is held at a time point when the reset clock hold signal is generated, and wherein the third counting value of the count clock signal of the reset time period is a changed reset code.

8. The image sensor of claim 1, wherein the test mode comprises the reset time period and a signal time period, wherein the counting operation of the counter includes a first counting operation with respect to a reset signal that is generated from the plurality of pixels and a second counting operation with respect to an image signal that is generated from the plurality of pixels, wherein the first counting operation is tested in the reset time period, wherein the second counting operation is tested in the signal time period, and wherein the reset code is configured to be changed every horizontal time period.

9. The image sensor of claim 8, wherein the horizontal time period is a time period during which a test is performed for the counting operation of every counter included in the analog-to-digital converter in the test mode.

10. A test method of an image sensor for converting an analog signal generated in each of a plurality of pixels into a digital signal using a counter in an analog-to-digital converter, the test method comprising:

generating a count clock signal based on a test code that is received in response to a test mode signal;

changing a reset code to output different values for each horizontal time period, wherein the reset code comprises a first counting value according to the count clock signal in a reset time period of a test mode;

counting the count clock signal according to the reset code;

comparing a second counting value with the test code, wherein the second counting value is obtained by subtracting the reset code from an image code, and wherein the image code is a counting value during a signal time period of the test mode; and outputting a comparison result between the second counting value and the test code through a test terminal.

11. The test method of claim 10, wherein the generating of the count clock signal comprises:

generating a count enable signal corresponding to a time period of the test mode; and generating a clock signal during the time period of the test mode as the count clock signal.

12. The test method of claim 11, wherein the changing of the reset code comprises:

changing a count enable signal of the reset time period into a changed count enable signal of the reset time period by performing a phase-shift on the count enable signal of the reset time period;

changing the count clock signal into a changed count clock signal by masking the changed count enable signal on a clock signal of the reset time period; and outputting a changed reset code that is based on the changed count clock signal.

13. The test method of claim 12, wherein the changing of the count enable signal of the reset time period comprises:

gradually increasing or decreasing a length of time of the count enable signal of the reset time period through the phase-shift on the count enable signal of the reset time period for each horizontal time period.

14. The test method of claim 11, further comprising:

generating a random code based on a random number generated for each horizontal time period; and changing the reset code based on the random code.

15. The test method of claim 14, wherein the changing of the reset code comprises:

comparing the reset code with the random code;

generating a reset clock hold signal when the reset code and the random code are equal to each other;

holding the count clock signal of the reset time period according to the reset clock hold signal; and outputting a third counting value of the count clock signal of the reset time period that is held at a time point when the reset clock hold signal is generated, wherein the third counting value of the count clock signal during the reset time period is a changed reset code.

16. The test method of claim 10, wherein the test mode comprises the reset time period and a signal time period, wherein a counting operation of the counter includes a first counting operation with respect to a reset signal that is generated by the plurality of pixels and a second counting operation with respect to an image signal that is generated by the plurality of pixels, wherein the first counting operation is tested in the reset time period, wherein the second counting operation is tested in the signal time period, and wherein the reset code is configured to be changed every horizontal time period.

17. The test method of claim 16, wherein the horizontal time period is a time period to perform a test for the counting operation of every counter included in the analog-to-digital converter in the test mode.

18. A test circuit for a counter of an image sensor, the test circuit comprising:

a test pattern generator that is configured to receive a test code from an external circuit when in a test mode;

a clock controller that is configured to generate a count clock signal, generate a count enable signal corresponding to the test mode, and periodically change a reset code based on the counter, wherein changing the reset code comprises determining a value of the reset code at least in part by:

determining a first counting value during reset time period by counting the count clock signal during the reset time period among time periods of the count enable signal; and assigning the determined first counting value as the value of the reset code; and a comparison logic that is configured to output a comparison result between an output counting value according to the count clock signal and the test code based on the reset code.

19. The test circuit of claim 18, wherein the clock controller is configured to:

change a count enable signal of the reset time period into a changed count enable signal of the reset time period by performing a phase-shift on the count enable signal of the reset time period; and change the reset code by changing the count clock signal in the reset time period based on the changed count enable signal of the reset time period.

20. The test circuit of claim 18, further comprising a reset test block, wherein the reset test block comprises:

a random code generator that is configured to generate a random code based on a random number generated for each horizontal time period; and a reset test pattern generator that is configured to compare the reset code with the random code and generate a reset clock hold signal for changing the reset code when the reset code and the random code are equal to each other.

\* \* \* \* \*